United States Patent Office 3,438,315
Patented Apr. 15, 1969

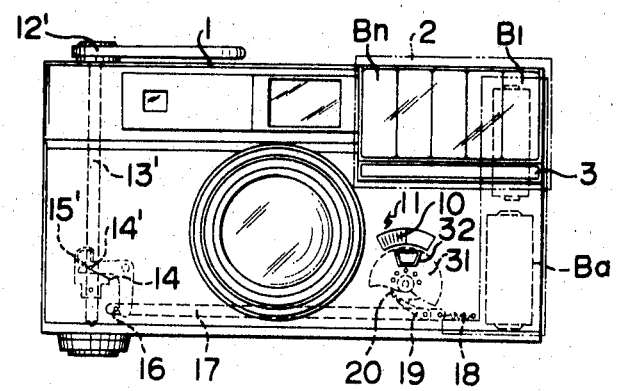
FIG. 4
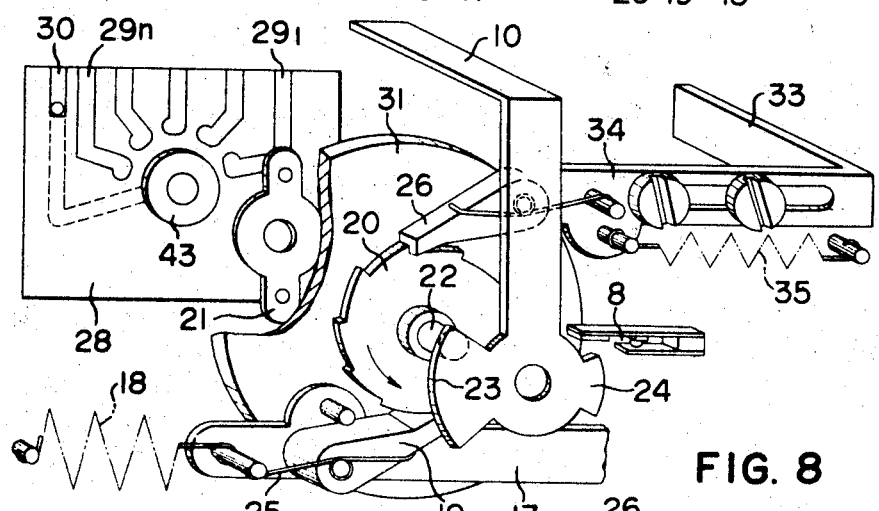
FIG. 6
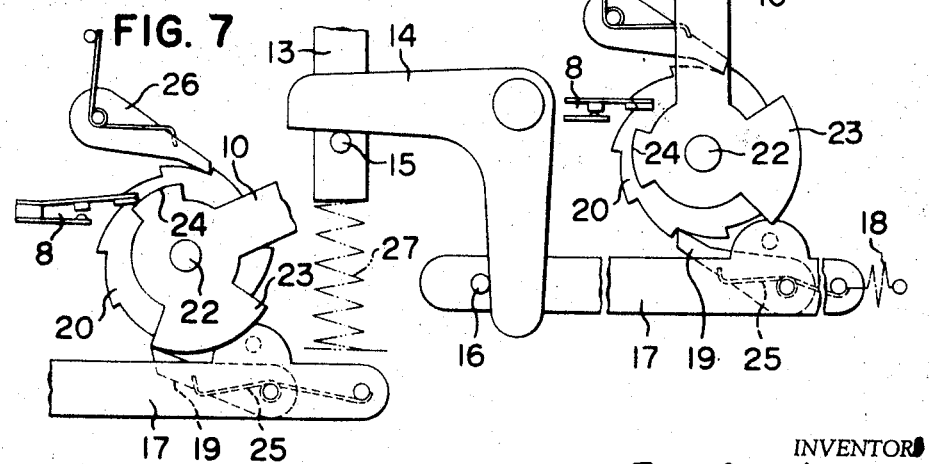
FIG. 7
FIG. 8

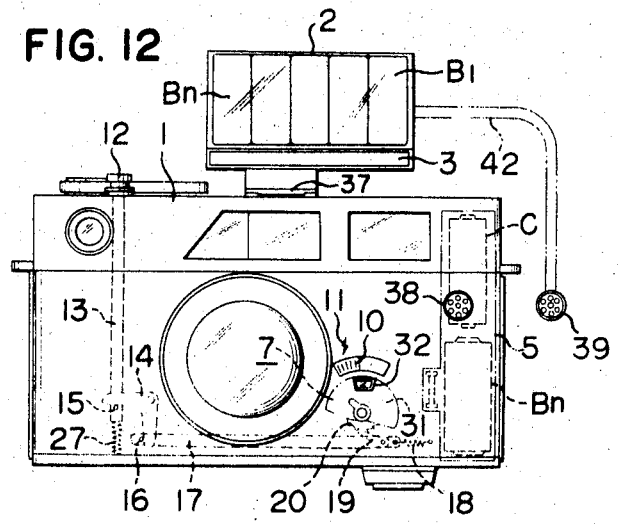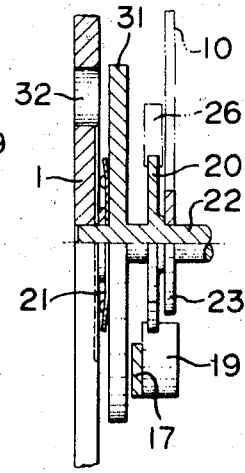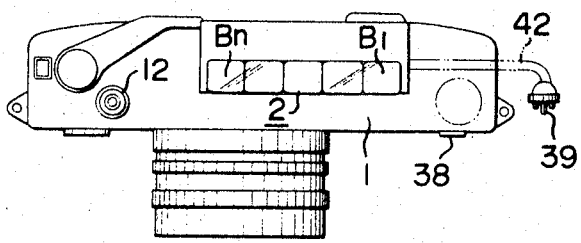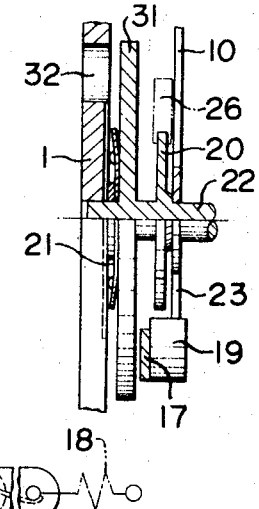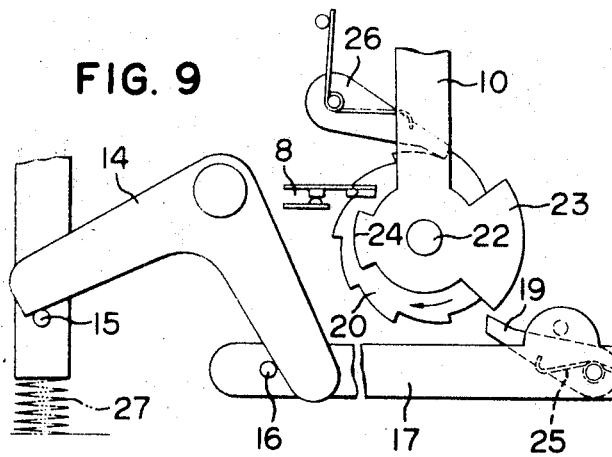

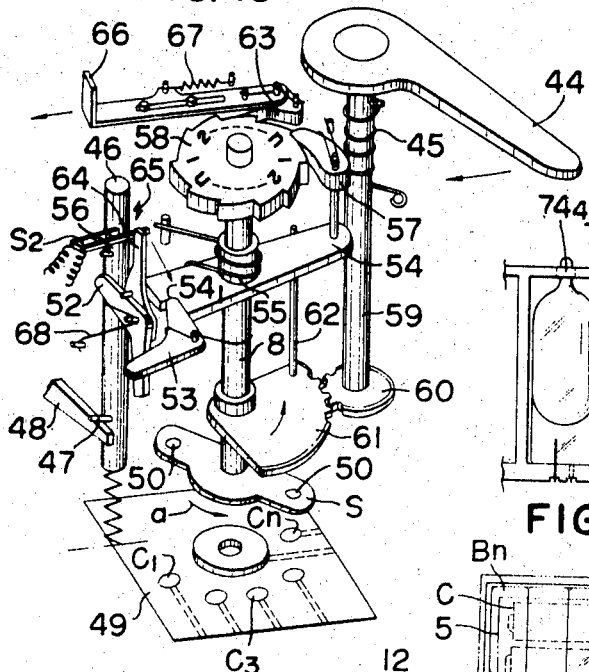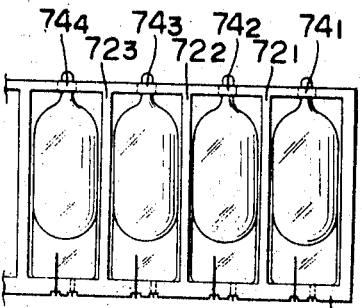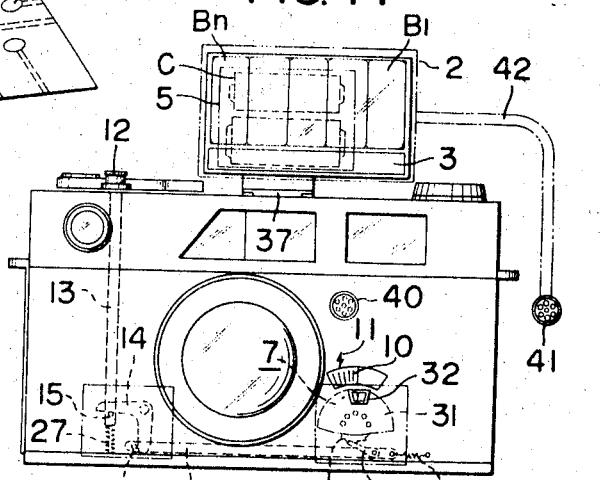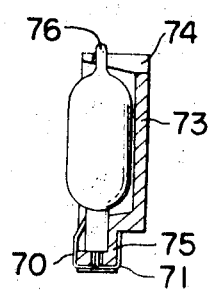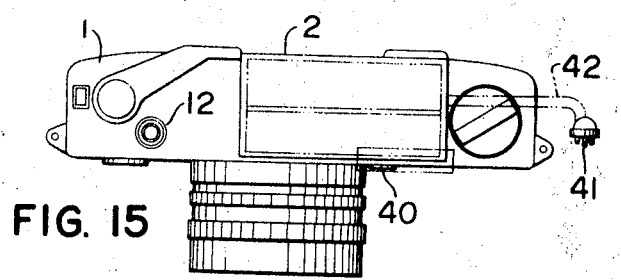

3,438,315
MULTIFLASH ARRANGEMENT FOR CAMERAS
Takeshi Goshima and Koichi Takado, Tokyo, Japan, assignors to Canon Camera Kabushiki Kaisha, Tokyo, Japan, a corporation of Japan
Filed Oct. 12, 1965, Ser. No. 495,095
Claims priority, application Japan, Oct. 12, 1964, 39/58,230
Int. Cl. G03b 9/70
U.S. Cl. 95—11.5
11 Claims

ABSTRACT OF THE DISCLOSURE

A multiflash arrangement for a camera in which a multiplicity of flash lamps mounted in a cartridge may be sequentially selected automatically, or individually selected manually, through a ratchet mechanism and stepping switch. The ratchet mechanism is advanced by spring charging elements controlled by the shutter release button or the film advancing lever of the camera. The arrangement is such to permit its incorporation into the camera body, or the multilamp cartridge alone or with its power supply may be detachably mounted as a unit on the camera body.

---

This invention relates to a multiflash arrangement for cameras permitting sequence flash photographs to be taken in rapid sequence.

In one conventional system of this type, an electromagnet is used, ignition of a flash lamp subsequently energizing the electromagnet, which, in turn, drives a feed pawl to rotate a ratchet wheel for selecting the electric circuit for the next flash lamp. Such a system, however, cannot be built into a camera because of the complicated structure. Moreover, the components necessary for the system are constructed separately from the camera and connected to the camera flash synchronizing contact. It thus is very inconvenient to handle and carry.

One of the objects of this invention is to provide a multiflash attachment for a camera of simplified construction which may be built into a camera, providing easy handling and accurate operation, and whereby a series of action photographs may be taken in rapid sequence.

Another object is to provide a multiflash unit for a camera which permits automatic or manual selection of the flash lamp firing circuits.

Another object of the invention is to provide a multiflash apparatus for a camera employing a cartridge in which more than two flash lamps are mounted.

Another object is to provide a multiflash apparatus wherein the flash lamp mounting device, or the device and its power source, is constructed as a separate unit to be mounted on the camera body, the actuating mechanism thereof being in the camera body.

Another object of this invention is to provide a multiflash lamp cartridge involving a plurality of flash lamps, which can be constructed to be compact in size, permits easy and swift replacement of flash lamps, generates few induced troubles, and is useful in rapid sequence flash photography.

Other objects, advantages and features of this invention will become more apparent from the following description of an illustrative embodiment in conjunction with the drawings in which:

FIG. 4 is another embodiment made in accordance with this invention;

FIG. 6 is an enlarged view of the contact change-over mechanism of the flash lamp circuit, viewed from the rear of the camera;

FIGS. 7 through 9, are the drawings illustrating the function of the change-over mechanism shown in FIG. 6;

FIGS. 10 and 11, are side views of the mechanisms shown in FIGS. 7 and 8, respectively;

FIG. 12 is a front view of a flash lamp mounting device designed to be removably mounted on the camera;

FIG. 13 is a plan view of the flash lamp mounting device in the embodiment shown in FIG. 12;

FIG. 14 is a front view of the flash mounting device and power supply unit designed to be removably mounted on the camera;

FIG. 15 is a plan view of the embodiment shown in FIG. 14;

FIG. 16 is an example of the change-over mechanism interlocked with film advancing mechanism of the camera;

FIG. 17 is a front view of a multiflash lamp cartridge; and

FIG. 18 is a partial section of the cartridge shown in FIG. 17.

Figure 1:
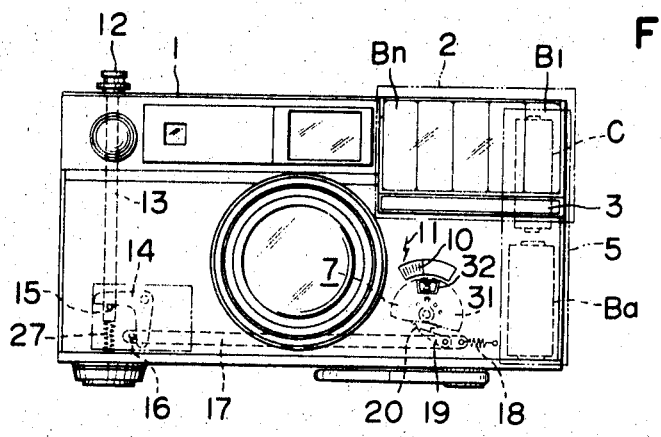
FIG. 1 is a front view of a camera with a built in multiflash apparatus embodying this invention.
Figure 2:
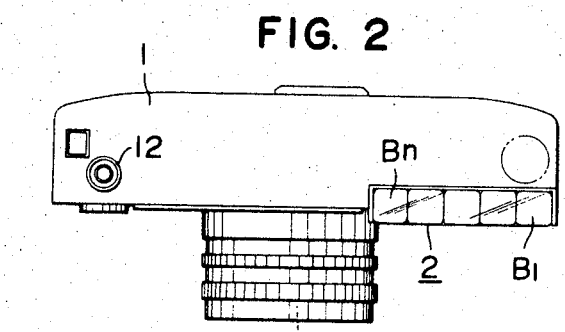
FIG. 2 is a plan of the camera shown in FIG. 1.
Figure 3:
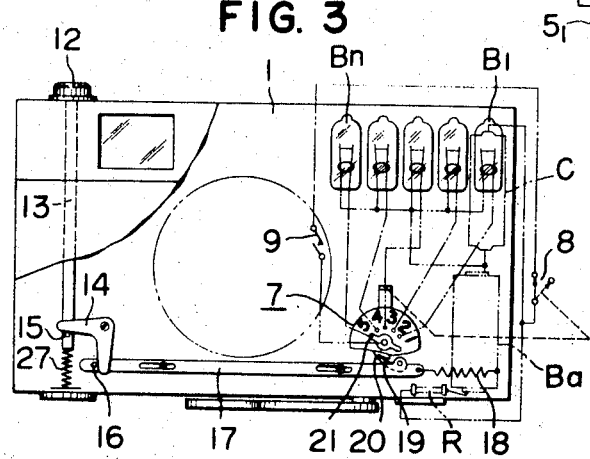
FIG. 3 is an outlined arrangement of respective components of the system and camera shown in FIG. 1.

To explain the invention in conjunction with the embodiments shown FIGS. 1 to 11, 1 is the camera and 2 is the flash lamp mounting device in which a plurality of flash lamps $B_1$ to $B_n$ are mounted. Element 3 shows the flash lamp mounting device on which terminal contacts $4_1$ to $4_n$ corresponding to flash lamps $B_1$ to $B_n$ and the common terminal $4_c$ are arranged. The power supply unit 5 consists of battery $B_a$, condensers C and adjusting resistors R. The mounting 3 and power unit 5 are built in the camera body. As shown in FIGS. 3 and 4, a switch arm 6 is provided for terminal contacts $4_1$ to $4_n$ corresponding to flash lamps $B_1$ to $B_n$, the power supply unit 5, the power switch 8 and the camera flash synchronizing contact 9, are all arranged in the camera. When the change-over lever 10 for ordinary or flash photography is in position 11 as shown in FIG. 1, the power switch 8 is closed as will hereinafter be described, and the contact change-over mechanism 7 of the flash lamp electrical circuit is ready for operation.

The change-over mechanism 7 is composed of an automatic device interlocking with the shutter release mechanism and a manual device using a part of the automatic device. When the shutter release button 12, in FIGS. 1 to 3, is depressed, the bellcrank lever 14 held by a pin 15 on the shaft 13 of the release button is rotated by means of the spring 18. Meanwhile, the sliding lever 17 abutted by pin 16, on the bellcrank lever 14 is shifted toward the right (in FIGS. 1 to 3) by spring 18. At the same time the ratchet feed pawl 19 mounted on the sliding lever moves toward the right. When the release button 12 is reset by the spring 27, the parts 14 to 19 return to their initial positions. If the lever 10 is set for ordinary photography, the feed pawl 19 will not advance the ratchet wheel 20 as will hereinafter be described. But if the lever 10 is set for flash photography, the feed pawl 19 is reset toward the left, with the result that the ratchet wheel 20 is rotated at a predetermined angle by means of the feed pawl 19. The change-over plate 21, is actuated by the advance of the ratchet wheel for selection of contacts $4_1$ to $4_n$ corresponding to flash lamps $B_1$ to $B_n$ each time the release button is depressed.

Flash ignition is effected by the closing of the flash synchronizing contact 9, via the switch 8 (closed when the lever 10 is set forth flash photography), the contact 9, switch arm 6, and one of terminal contacts $4_1$ to $4_n$ of flash lamps $B_1$ to $B_n$, through the common terminal $4_c$ to power supply unit 5.

After closing of the preceding electrical circuit, a new flash lamp circuit will be closed interlocking with the next releasing operation.

The change-over mechanism, as illustrated in FIG. 4, is interlocked with the film advancing mechanism of the camera, a manual override being provided to permit manual selection of the flash circuits.

In FIG. 4, when the film advancing lever 12' is actuated for advancing the film, a circular cam 15' fixed on the shaft 13' of the lever rotates. Then the pin 14' in the bellcrank lever and riding on the cam is moved up or down by the cam surface. Rotation of the advancing lever 12' causes the circular cam 15' to move the pin 14' upwardly, resulting in rotation of the bellcrank lever 14 in a clockwise direction. The sliding lever 17 abutting the bellcrank lever 14 through the pin 16 due to the spring 18, moves toward the left, and the ratchet wheel 20 is rotated a predetermined angle by means of the feed pawl 19 fixed on the sliding lever 17. Thus the changeover plate 21, or changing piece, selects one after another of the electrical contacts $4_1$ to $4_n$ corresponding to flash lamps $B_1$ to $B_n$.

When the film advancing lever completes the film advance and returns to its original position, the feed pawl 19 does not act on the ratchet wheel 20 but the parts 14–19 return to their initial positions.

To show an example of the structure of the contact change-over mechanism 7 in the flash lamp electrical circuit in detail the change-over lever 10 is rotatably mounted on the shaft 22 on which the ratchet wheel 20 and change-over plate 21 are secured, as shown in FIG. 6. When the lever 10 is set for ordinary photography, the projection 23 forming a part of the lever 10 forces the feed pawl 19 downwardly against the bias of the spring 25 to disengage the pawl and the ratchet wheel 20. The projection 24 on the change-over lever 10 opens the power switch 8. Thus neither the change-over mechanism nor flash lamp are actuated though the sliding lever 17 is returned to its initial position. Element 26 is the check pawl of the ratchet wheel 20. (See FIGS. 7 and 10.)

When the change-over lever 10 is set for flash photography, the projections 23 and 24 are in their inoperative positions. Thus the feed pawl 19 engages the ratchet wheel 20, and the power switch 8 is closed. (See FIGS. 5, 7 and 8). In releasing, the sliding lever 17 is shifted toward the right by the spring 18, i.e., from the condition shown in FIG. 7 to that in FIG. 9. When the shutter release button 12 is released, it is reset by the spring 27 and at the same time both the ratchet wheel 20 and change-over plate 21 are rotated a definite angle.

Element 28 is the change-over terminal board forming a part of the mounting 3. Contacts $29_1$ to $29_n$ corresponding to flash lamps $B_1$ to $B_n$ are arranged around an annular contact or conductor 43 centering the shaft 22. The contact 30 connected to the power supply unit is coupled to the changing plate 21 via the electric conductor 43.

The dial plate 31 is fixed on the shaft 22, and the numbers showing the sequence of flash lamps etched in the face of the dial can be read through the window 32 shown in FIG. 1.

Figure 5:
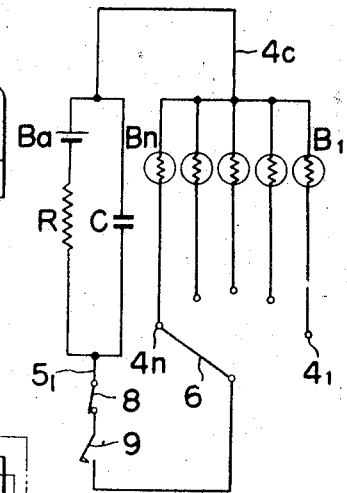
FIG. 5 is a wiring diagram of the system made in accordance with this invention.

In flash photography the flash lamps are all used on a sequential basis but sometimes a particular one may be selected and used for certain shadow effects. In such instances it will be more convenient to select any desired lamp or lamps manually. To meet such requirement, the check pawl 26 of the ratchet wheel 20, as shown in FIG. 5, is designed either to be integral with the manual change-over handle 33 or to be mounted on the sliding plate 34 which interlocks with the pawl. Thus when the handle 33 is operated, both the sliding plate 34 and pawl 26 move forward against the return spring 35 and as a result, the ratchet wheel 20 is rotated at a predetermined angle as in the case of automatic change-over operation.

In the examples of application as shown in FIGS. 1–11, both the flash lamp mounting device 2 and the power supply unit 5 are built in the camera. According to need it may be desirable to separate the flash lamp mounting device 2 or both the flash lamp mounting device 2 and the power supply unit 5 from the camera.

FIGS. 12 and 13 show an embodiment wherein the flash lamp mounting device 2 is separated from the camera, while FIGS. 14 and 15 illustrate an embodiment wherein both the flash lamp mounting device 2 and power supply unit 5 are separated from the camera. In either case, these devices may be mounted to the camera 1 using, say, a camera accessory clip 37. In the embodiment shown in FIGS. 12 and 13, connectors 38 and 39 may be provided on the camera and the flash lamp mounting, respectively, each, to connect the contacts $4_1$ and $4_n$ and the contact $4_c$ shown in FIG. 5.

Also in the embodiment shown in FIGS. 14 and 15, connectors 40 and 41 having a terminal corresponding to the power terminal $5_1$ may be furnished. If such provision is made, the devices can be used quite similarly to the case shown in FIGS. 1 to 11.

Another embodiment of the invention interlocked with the film advancing mechanism is shown in FIG. 16.

In FIG. 16, 44 is the film advancing lever for the film advancing and shutter charging mechanism of the camera. A reset spring 45 is loaded on the axis of the advancing lever 44, and this lever is rotated by the reset spring 45 from the position in which film advance is completed in the direction of the arrow, or in the clockwise direction until it reaches its original position.

Element 46 shows the release rod, and releasing is effected by letting the pin 47 fixed on the rod push down one end of the release rod 48.

As shown, when the change-over lever 64 is set in the flash position 65, the flash synchronizing contact is closed for ignition of the flash lamp simultaneously with releasing operation. A gear 60 is provided on the shaft 59 of the film advancing lever 44, and the gear 61, engaging with the gear 60, is rotatably mounted on the shaft 51. At the top and bottom of the shaft 51 are, respectively, the ratchet wheel 58 and the moving changeover contact plate S. Also on the shaft 51 is rotatably mounted the feed pawl arm 54 provided with the spring 55 and biased thereby in the clockwise direction.

The engagement stop stage $54_1$ is formed at one end of the feed pawl arm 54 for retaining the pawl arm against the bias of the spring 55, while the feed pawl 55 to advance the ratchet wheel 58 is fitted at the other end. Another spring is furnished on the feed pawl 57 in order to press it into engagement with the ratchet wheel 58.

Element 49 is the change-over terminal board corresponding to 28 in FIG. 6, and terminal contacts $C_1$ to $C_n$ are arranged in a circular form and at equal intervals on that board. The moving change-over contact plate S is fixed on the shaft 51 as stated above, its contact 50 and $C_1$ to $C_n$ being connected to the power supply unit and the flash lamp socket, respectively.

In advancing the film, the advancing lever 44 is rotated in the counterclockwise direction. This rotation makes the feed pawl arm 54 rotate around the shaft 51 in the clockwise direction against the spring 55 via the pin 62 fitted on the gear 61. At the same time, the feed pawl 57 on the feed pawl arm 54 slides over the ratchet wheel 58 to the next tooth. Just before the film advance is completed, the L-shaped engaging lever 53 pivoted on the camera body engages the stage $54_1$, thus holding the feed pawl arm 54. When the film advance is completed, the advancing lever 44 is returned in the direction of the arrow in FIG. 16 by the spring 45, and reset in the original position together with the pin 62. In this way, charging of the contact changing mechanism is effected.

In releasing, if the release shaft 46 is further pushed down after it is released, the pin 56 fixed on the shaft pushes the pivoted lever 52 and rotates it in the counterclockwise direction. Then the engaging lever 53 is rotated in the same direction, thereby releasing the feed pawl arm 54. As a result, the feed pawl arm 54 rotatably mounted on the shaft 51 is rotated in the counterclockwise direction by means of the charged spring 55. At the same time, the feed pawl 57 provided at one end of the feed pawl arm 54 rotates the ratchet wheel 58 fixed on the shaft 51 a predetermined angle, thus selecting contacts $C_1$ to $C_n$.

As previously explained, selection of contacts $C_1$ to $C_n$ is accomplished by rotating the rotary shaft 8 interlocking with the advancing lever at an angle corresponding to contacts $C_1$ to $C_n$ in the direction of the arrow each time an exposure is made.

Accordingly, charging of the changing mechanism is effectively interlocked with the advancing lever and a contact can be selected automatically by disengaging the engaging pawl interlocked with shutter releasing. Thus easier releasing can be carried out than the case where charging is made interlocked with shutter release.

When photo flash is not used, the changing lever 64 is turned from the flash symbol 65 position in the clockwise direction to make the setting of ordinary photography. By doing this, the lever 52 rotates in the clockwise direction by means of the spring 68, thus moving out of the path of the pin 56. As a result, when shutter release is made, the engaging lever 53 is not moved, and the feed pawl arm 54 is kept in the charging position, resulting in the idle movement of the pin 62.

Flash photography at any time can be made by pulling the manual changing knob 66 in the direction of the arrow against the return spring 67. The feed pawl 63 then rotates the ratchet wheel 58 to select a flash lamp circuit.

The multi-flash lamp cartridge, shown in FIGS. 17 and 18, is a very useful arrangement in providing fast, sequential flash exposures according to the present invention. To explain its structure in conjunction with the drawings, 69 is the cartridge itself in whch flash lampo $B_1$ to $B_n$ are arranged in parallel and where a plurality of partitions 72 are arranged to prevent the flash lamps from being ignited by induction. Each flash lamp mounting part separated by partitions 72 has an optical reflection face of a semi-cylindrical type formed by the partition 72 and its back 73. A notch 74 is provided at the top of the mounting part to retain the projection 76 of a flash lamp. At the bottom base 75 of the cartridge is a hole through which flash lamp lead wires 70 and 71 are held in position. A plurality of lamps are maintained securely in the flash lamp cartridge of the above-mentioned construction, with their projections 76 inserted in notches 74 and their lead wires 70 and 71 inserted in the holes, respectively.

The multiflash lamp cartridge is mounted to the flash lamp mounting device 2 having the electrical flash lamp mounting device 3 and an ejector. After all lamps have been ignited, the flash lamps may be replaced together with their cartridge itself easily and quickly.

It will be understood that this invention is not limited to the specific materials, figures, etc., and other details described above and illustrated in the drawing, but can be carried out with various modifications without departing from the scope of the invention, as defined in the appended claims.

We claim:

1. Multiflash arrangement for a camera having film advance and shutter release mechanisms, comprising:
    a ratchet wheel rotatably mounted within the camera body,
    a pawl member movable between two extreme positions,
    a spring biasing the pawl member to one extreme position,
    a spring biased pawl on the pawl member cooperating with the ratchet wheel,
    means operable by one of the camera mechanisms for moving the pawl member against the bias of its spring to its other extreme position upon initiation of operation thereof to advance the pawl and ratchet wheel one step, the release of the camera mechanism permitting the spring to return the pawl member to its one extreme position to advance the pawl to the next ratchet tooth,
    a plurality of spaced electrical contacts,
    a switch arm movable by the ratchet wheel to engage individually each of the contacts as the ratchet wheel is advanced a step,
    a plurality of flash bulbs connected individually to the contacts,
    an electrical circuit including a battery supply interconnecting the flash bulbs, contacts and switch arm,
    and a flash synchronizing switch operated by the camera shutter mechanism to complete a firing circuit to one of the flash bulbs connected by the switch arm into the electrical circuit.

2. Multiflash arrangement according to claim 1, wherein the means for moving the pawl member comprises:
    a pivoted bellcrank having one arm acting as a detent for the movable pawl member, the other arm of the bellcrank cooperating with the camera mechanism to hold the pawl member in its other extreme position against the bias of the pawl member spring, operation of the camera mechanism releasing the bellcrank to permit movement of the pawl member to its one position by the bias of the spring.

3. Multiflash arrangement according to claim 2 wherein:
    a change-over lever is provided movable between a flash position and an off position,
    a normally closed power switch in the electrical circuit,
    a first camming surface on the change-over lever cooperating with the power switch to open the power switch when the lever is in its off position, and
    a second camming surface on the change-over lever cooperating with the ratchet pawl to prevent the pawl from advancing the ratchet wheel when the lever is in its off position.

4. Multiflash arrangement according to claim 3, wherein a detent pawl is provided for the ratchet wheel,
    a manual selector lever movable between an actuation and a non-actuation position, the detent pawl being pivoted to the selector lever and movable thereby to advance the ratchet wheel when the lever is moved to its actuation position for manual selection of the flash bulb circuit.

5. Multiflash arrangement according to claim 4 wherein:
    a shaft is rotatably mounted within the camera casing, the ratchet wheel being secured to the shaft and the change-over lever is rotatably mounted thereon, and the switch arm in the form of a contact plate is secured to the shaft,
    a terminal board juxtaposed to the contact plate, said terminal board having thereon the spaced contacts engaged by the contact plate.

6. Multiflash arrangement according to claim 1, wherein:
    a cartridge is provided for the flash bulbs, said cartridge having circuit connections for the flash bulbs, and being divided into aligned compartments for each of the bulbs, and
    reflector means provided for each of the cartridge compartments.

7. Multiflash arrangement according to claim 6, wherein the flash bulb cartridge as well as the battery are mounted within the camera body.

8. Multiflash arrangement according to claim 6, wherein a housing is provided for the flash bulb cartridge and the battery, the housing being removably securable to the camera body, and
    cable means interconnecting the electrical elements in the housing and within the camera body.

9. Multiflash arrangement according to claim 6, wherein a housing is provided for the flash bulb cartridge, the housing being removably securable to the camera body, the battery being within the camera body, and
cable means interconnecting the electrical elements in the housing and within the camera body.

10. Multiflash arrangement according to claim 1, wherein:
the movable pawl member is a slide lever translatory between two extreme positions,
a bellcrank pivotedly mounted in the camera body,
a pin on the slide lever engaging one arm of the bellcrank,
a finger depressible member for the shutter release mechanism of the camera,
a second spring biasing the depressible member upwardly upon release of finger pressure, the second spring being stronger than the slide lever spring,
a pin on the depressible member to rotate the bellcrank upon release of finger pressure by the bias of the second spring to move the slide lever to its other extreme position, the depression of the depressible member permitting the slide lever spring to move the slide lever to its one extreme position.

11. Multiflash arrangement according to claim 1, wherein the movable pawl member is a slide lever translatory between two extreme positions, a bellcrank pivotally mounted in the camera body, a pin on the slide lever engaging one arm of the bellcrank,
a film advancing mechanism having a rotatable shaft,
a cam on the rotatable shaft of the film advancing mechanism, and
a pin on the other arm of the bellcrank forming a cam follower for the cam, rotation of the film advancing shaft during a film advancing operation lowering the bellcrank pin to permit the slide lever spring to move the slide lever to its one position, return rotation of the film advancing shaft lifting the bellcrank pin to move the slide lever to its other extreme position.

References Cited
UNITED STATES PATENTS

| | | | |
|---|---|---|---|
| 2,191,402 | 2/1940 | Saffir et al. | 95—11.5 |
| 2,671,387 | 3/1954 | Knight | 95—11 |
| 2,697,390 | 12/1954 | Kindelberger | 95—11 |
| 3,077,534 | 2/1963 | Brandt | 240—1.3 |
| 3,263,068 | 7/1966 | Jakob | 240—37 XR |

NORTON ANSHER, *Primary Examiner.*

F. L. BRAUN, *Assistant Examiner.*

U.S. Cl. X.R.

240—1.3, 37.1